Jan. 6, 1959 T. D. HEATH ET AL 2,867,526
METHOD FOR REMOVING ARSENIC FROM ARSENOPYRITE ORES
Filed March 14, 1957
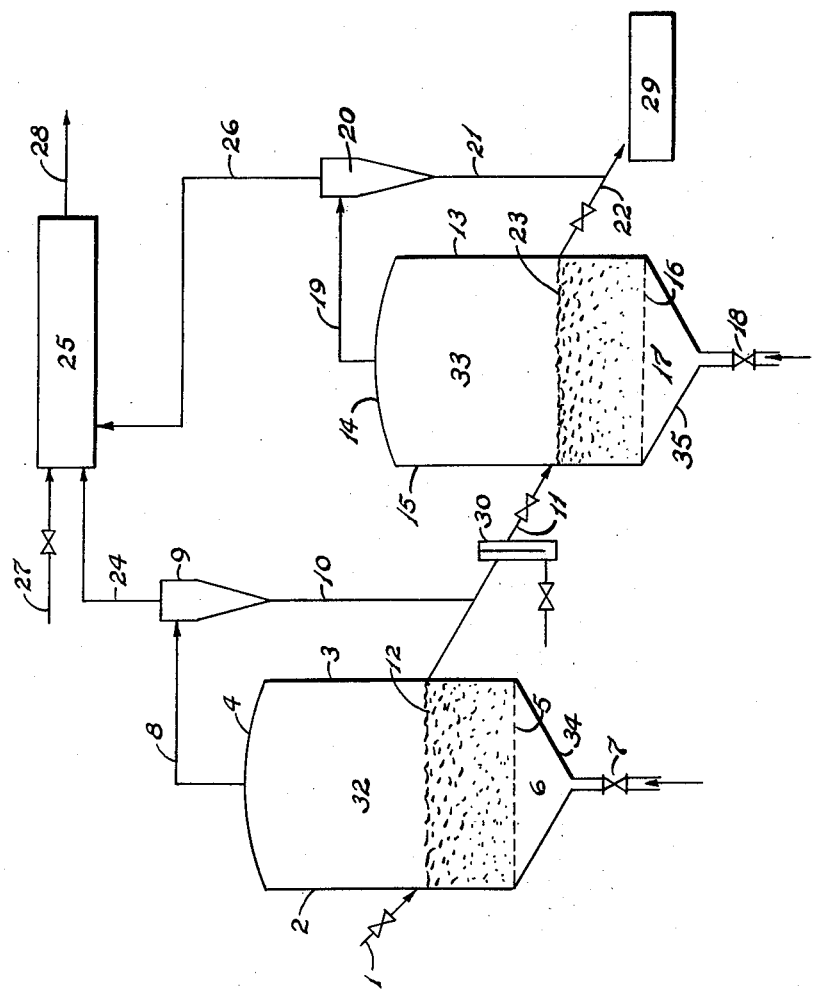
INVENTORS
THOMAS D. HEATH
NORBERT G.T. HOLLE
BY
Robert R. Finch
Attorney United States Patent Office 2,867,526
Patented Jan. 6, 1959

2,867,526
METHOD FOR REMOVING ARSENIC FROM ARSENOPYRITE ORES

Thomas D. Heath and Norbert G. T. Holle, Westport, Conn., assignors to Dorr-Oliver Incorporated, Stamford, Conn., a corporation of Delaware Application March 14, 1957, Serial No. 646,064

9 Claims. (Cl. 75—9)

This invention relates generally to the fluidized roasting of iron sulfide ores which additionally contain arsenic, such as arsenopyrite ores. More particularly, this invention relates to an improved process for the fluidized roasting of such ores wherein the iron content is converted to an iron oxide, the sulfur content is converted to sulfur dioxide, and the arsenic content is substantially eliminated from said products.

By fluidization of fine solids is meant the maintenance of a dense-suspension of such solids in a gas stream upflowing at a specified space rate whereby the dense-suspension is similar in appearance to a boiling liquid and presents a liquid-like surface level. Because of this behavior, the suspension is referred to as a fluidized bed. For convenience, fluidizing gas velocities are referred to as "space rates" or "superficial velocities" and are measured as the linear rate at which the supplied gas stream would flow through a reactor devoid of solids.

The outstanding characteristics of fluidization are as follows: (a) the suspension contains a very high concentration of solids per unit volume, (b) the solids therein are in erratic, zig-zag turbulent motion, (c) the suspension behaves substantially like a liquid in its flow characteristics and (d) the temperature throughout the suspension is quite uniform, i. e. the suspension may be described as thermally homogeneous. These characteristics are to be contrasted on the one hand with a dense, thermally heterogeneous fixed or moving bed of solids having gas percolating upwardly therethrough and on the other hand with a typical dilute gas suspension such as dusty air wherein the suspension acts principally like the suspending gas.

Fluidization of fine solids with concomitant treatment of the solids by the fluidizing gas may be accomplished in different ways and in several forms of reactors. A simple type of fluidization apparatus comprises a vertical vessel or reactor lined with refractory material. Internally, a horizontal apertured partition or constriction plate divides the vertical cylindrical reactor into an upper bed section and a lower gas receiving section or windbox. Conduit means serve to conduct gas under pressure to the windbox section of the reactor, whence it passes upwardly through apertures of the constriction plate into and through the mass of solids at a velocity causing fluidization thereof. Exiting gases rise through a dust disengaging section (hereinafter referred to as the free-board) and are conducted to discharge or further treatment from an upper portion of the vessel. Fresh solids to be treated are supplied to the bed from above the surface thereof or at a point above the constriction plate but below the surface level of the bed; treated solids are conducted from the bed by a conduit, the upper or solids entrance end of which may determine the surface level of the bed.

The fluidized-solids technique has been applied successfully to many operations including the exothermic roasting of iron pyrites and pyrrhotites in which the uprising gas stream contains sufficient free oxygen to oxidize exothermically the sulfur content of the material, thus converting the iron and sulfur to their respective oxides. The iron oxide calcine from such roasting operation can then be sintered and used for blast furnace feed while the resulting $SO_2$ gas can be utilized in a variety of known processes.

Although the fluidized roasting of iron sulfide ores has been widely used, fluidization has not heretofore been successfully applied to the roasting of iron sulfide ores contaminated with arsenic for use in the production of iron and steel. This results from the fact that iron and steel manufacturers' specifications require that the arsenic content of blast furnace feed be exceedingly low; generally 0.10% is the maximum quantity of arsenic which can be tolerated for such uses, and a much lower arsenic content is desired. Thus, substantially complete arsenic elimination must be achieved to make the fluidized roasting of such arsenic-bearing iron sulfides a useful commercial process in connection with the production of iron. To remove the arsenic from the iron sulfide ores in a fluidized roasting process, it is necessary to volatilize the arsenic content of such ores. Unfortunately, this adversely affects the recovery of the sulfur content of these ores since volatile arsenic and sulfur roasting products are both entrained in the fluidizing gas stream. Heretofore, in this process, expensive special treatment apparatus has been required to cleanse the fluidizing gas stream of the contaminating volatile arsenic products when recovery of the sulfur content of the ore was desired.

It is, therefore, an object of this invention to provide ways and means for the fluidized roasting of iron sulfide ores which contain arsenic impurities to yield roasted products substantially free of arsenic.

Another object is to provide simple inexpensive ways and means to separate arsenic from roaster gases to facilitate recovery of the sulfur content of the arsenic containing iron sulfide ore.

It has long been known that arsenic can be removed, at least in part, from arsenic-bearing metal sulfide ores through the use of fluidized techniques by incompletely or partially oxidizing the ores at elevated temperatures. In other words, the roasting atmosphere is oxygen-deficient in the sense that the roast is only partially completed as further defined below. Such conditions favor the formation of volatile arsenic compounds, such as $As_4O_6$ and $As_2S_2$, which leave the roasting zone with the exiting fluidizing gases. Excess oxygen cannot be tolerated as it will cause oxidation of volatile arsenic compounds to solid arsenic compounds, such as $As_2O_5$ and/or metal arsenates, which are not volatile under the roasting conditions.

In order to illustrate what constitutes the proper oxygen deficiency in a partial roast made for the purpose of removing arsenic as the volatile trioxide, the roasting of pyrite, contaminated with arsenopyrite, under various conditions of oxygen availability shall now be considered. Disregarding the possibilities of $SO_3$ formation, Equations 1 through 4 show, in order of increasing availability of free oxygen during roasting and of correspondingly increasing valance of the sulfur and iron in the roasting products, the various combination of iron and sulfur compounds which can be produced by roasting $FeS_2$. The formation of $SO_3$ is here excluded from consideration because of the high temperatures hereinafter prescribed by this invention for these partial roasts.

(1) $FeS_{2(s)} + \text{heat}$, in a neutral atmosphere
$$\rightarrow FeS_{(s)} + \tfrac{1}{2} S_{2(g)}$$
(2) $FeS_{2(s)} + O_{2(g)} \rightarrow FeS_{(s)} + SO_{2(g)}$
(3) $FeS_{2(s)} + 2\tfrac{2}{3} O_{2(g)} \rightarrow \tfrac{1}{3} Fe_3O_{4(s)} + 2SO_{2(g)}$
(4) $FeS_{2(s)} + 2\tfrac{3}{4} O_{2(g)} \rightarrow \tfrac{1}{2} Fe_2O_{3(s)} + 2SO_{2(g)}$ Similarly the various combinations of arsenic, iron, and sulfur compounds which can be produced by roasting FeAsS are shown, in order of increasing availability of free oxygen during roasting and of correspondingly increasing valance of the arsenic, sulfur, and iron in the roasting products, by Equation 1a through 4a and by Equation 5.

(1a) $FeAsS_{(s)} + heat$, in a neutral atmosphere
$\rightarrow \frac{1}{4}As_{4(g)} + FeS_{(s)}$
(2a) $FeAsS_{(s)} + \frac{3}{4}O_{2(g)} \rightarrow \frac{1}{4}As_4O_{6(g)} + FeS_{(s)}$
(3a) $FeAsS_{(s)} + 2\frac{5}{12}O_{2(g)}$
$\rightarrow \frac{1}{4}As_4O_{6(g)} + \frac{1}{3}Fe_3O_{4(s)} + SO_{2(g)}$
(4a) $FeAsS_{(s)} + 2\frac{1}{2}O_{2(g)}$
$\rightarrow \frac{1}{4}As_4O_{6(g)} + \frac{1}{2}Fe_2O_{3(s)} + SO_{2(g)}$
(5) $FeAsS_{(s)} + 3O_{2(g)} \rightarrow \frac{1}{2}As_2O_{5(s)} + \frac{1}{2}Fe_2O_{3(s)} + SO_{2(g)}$ Equations 1a through 4a are so numbered to indicate their relationship to Equations 1 through 4 with reference to the iron compounds in the roasting products.

In theory, it would be possible to regulate the supply of free oxygen so that the roasting would proceed completely in accordance with Equations 4 and 4a, without the formation of any non-volatile arsenic pentoxide. In practice this is not possible since slight inequalities of oxygen distribution throughout the fluidized bed result in the formation of some non-volatile arsenic pentoxide. Further, the formation of the non-volatile arsenic pentoxide is favorably influenced not only by increased quantities of free oxygen, but also by increased roasting temperatures. For this reason, at the high temperatures hereinafter prescribed by this invention for the roasting of these ores, it is not practical to introduce sufficient free oxygen to allow even complete roasting in accordance with Equations 3 and 3a. Still further, for reasons which will later become apparent, it is desirable to retain a portion of the sulfur in the form of FeS in the calcined product of this arsenic volatilization roast. From the foregoing, then, roasting under conditions of oxygen deficiency will be defined, in the case of the present example of pyrite contaminated by arsenopyrite, as a roast wherein the supply of free oxygen is so regulated that most of the ore will be oxidized in accordance with Equations 3 and 3a, but that simultaneously the remainder of the ore will be oxidized in accordance with Equations 2 and 2a, so that the total calcine produced contains approximately from about 2% to about 6% sulfur in the form of iron sulfide. Similarly, for the more general cases of roasting iron sulfide ores contaminated with arsenic minerals, roasting under conditions of oxygen deficiency may then be defined as roasting with the supply of free oxygen so restricted that most of the iron in the ore will be converted to $Fe_3O_4$, that the remainder of the iron in the ore remain in the form of iron sulfide and that the total calcine produced contain sulfide sulfur in the approximate amount of from about 2% to about 6% of the calcine.

Although the foregoing process has been successfully employed in certain fields, notably gold roasting, it has not been adaptable for use in roasting processes where both the roasted calcine and roaster gases must be substantially arsenic-free. As previously noted, the arsenic content of iron oxide calcines for blast furnace feed must be exceedingly low. Also, the roaster gases must be substantially free of arsenic contaminants if the sulfur content of these gases is to be utilized. These problems do not arise in gold roasting processes since far greater amounts of arsenic can be tolerated in the calcines and the roaster gases are generally discharged to waste without attempting to recover their sulfur content. A further complicating factor lies in the physical characteristic of many of the iron pyrite ores in that they are subject to decrepitation upon heating, thus causing considerable elutriation of fine product solids from the reactor by entrainment in the exiting gases. In some cases the quantity of such elutriated fines may be as much as 80% of the reactor feed. In order to recover these elutriated fines as product, dust separators are commonly provided to separate them from the exiting gases. However, during such separation, arsenic compounds tend to condense on the fines in sufficient amounts to contaminate and render them unacceptable as product for blast furnace feed. Further, sulfur recovery as sulfur dioxide is poor since complete oxidation of the contained sulfur in the ore requires an excess of oxygen which, perforce, results in the formation of the before mentioned solid arsenic compounds which will either contaminate the calcines in the bed or be collected by the dust separator along with the product fines.

The present invention overcomes the above disadvantages and at the same time produces both calcines and gases that are substantially arsenic free. This is accomplished, in accordance with the invention, in a continuous process employing a plurality of distinct but related steps carried out in a particular sequence and under carefully controlled conditions.

Briefly, the objects of this invention are achieved by partially roasting pyrite ores containing arsenic under conditions which cause arsenic compounds to volatilize and leave the roasting bed with the roaster gases. The arsenic compounds are then oxidized out of contact with the treated solids to form non-volatile arsenic compounds which are easily separated from the roaster gases. In a second roasting stage the partially roasted pyrites, from which the arsenic impurities have been removed, are fully oxidized. Thus, the production of arsenic free sulfur dioxide gases and arsenic free iron oxides is assured.

In somewhat more detail, the roasting of arsenic bearing iron sulfide ores is conducted in a two-stage fluidized operation in which the first fluidized reaction zone is maintained at a temperature of about 900° C., which temperature is significantly higher than heretofore employed in roasting gold bearing arsenopyrites. The atmosphere of this first zone is deficient in free oxygen, as previously defined. Roasted calcine from the first fluidized reaction zone is transferred to the second fluidized reaction zone which contains an excess of free oxygen whereby all remaining sulfide sulfur is oxidized to $SO_2$ and all iron is oxidized to $Fe_2O_3$. Excess free oxygen in this second fluidized zone is defined as free oxygen in excess of that amount necessary to convert all sulfur to sulfur dioxide and all metals to their highest oxides.

A first cyclone, or other suitable dust separator, removes elutriated fines from gases exiting the first reaction zone and such fines are directed to the second fluidized reaction zone. A second cyclone or other suitable dust separator separates elutriated product fines from gases exiting the second zone, and such fines are co-mingled with the other fully roasted calcines leaving such second zone.

Volatile arsenic compounds are prevented from condensing on fine solids in the first cyclone by maintaining temperatures therein in excess of the sublimation temperature of such compounds. This high temperature is maintained by insulating the cyclone and sustaining sufficiently high reaction temperatures in the first roasting zone to compensate for any heat losses prior to separation of the fines.

Effluent gases from the first cyclone contain, inter alia, volatile arsenic compounds (e. g. $As_4O_6$ and $As_2S_2$) as well as elemental sulfur vapor and sulfur dioxide, while effluent gases leaving the second cyclone contain $SO_2$ and free oxygen. The effluent gases from both cyclones are directed to a combustion chamber and co-mingled therein. Free oxygen bearing gases, if required, are separately introduced into the combustion chamber to supplement the free oxygen of the co-mingled effluent gases and thereby effect oxidation of said effluent gases; that is, sulfur is oxidized to $SO_2$ and arsenic is oxidized to a non-volatile form such as $As_2O_5$. Fully oxidized gases are then led from the combustion chamber to suitable gas scrubbing and/or electrostatic precipitation means which remove the now solid arsenic compounds. The arsenic-free $SO_2$ gas is now in condition for use in further processes, such as the manufacture of sulfuric acid. Thus, essentially complete recovery of the sulfur values of the ore is achieved and the contaminating arsenic is removed both from the calcined iron oxide and the sulfur dioxide gases.

In order that it may be clearly understood and readily carried into effect, the invention will now be described, by way of example, with reference to the accompanying drawing.

The drawing is a diagrammatic view illustrating a preferred embodiment of this invention.

Conduit means 1 are provided to introduce finely divided particles into a first reactor 2 which is defined by a generally cylindrical sidewall 3, top section 4 and lower conical section 34. A perforated constriction plate 5 divides reactor 2 into upper treatment zone 32 and a lower windbox zone 6 into which fluidizing gases are introduced via valved conduit means 7. A dust separator 9 communicates with reaction zone 32 via a conduit 8 and is provided with a tailpipe 10 and a gaseous effluent discharge conduit 24. A conduit 11 communicates with reaction zones 32 and 33 and tailpipe 10.

A second reactor 13 is defined by a generally cylindrical sidewall 15, top section 14 and lower conical section 35. A perforated constriction plate 16 divides reactor 13 into upper treatment zone 33 and lower windbox zone 17 into which fluidizing gases are introduced via valved conduit means 18. Dust separator 20 communicates with reaction zone 33 via conduit 19 and is provided with tailpipe 21 and gaseous effluent discharge conduit 26. A valved conduit 22 is provided to discharge treated solids from reaction zone 33.

Conduit means 24 and 26 discharge into combustion chamber 25 which is provided with a valved inlet conduit 27 and discharge conduit 28.

In operation, finely divided iron sulfide ores containing arsenic contaminants are introduced into reaction zone 32 via conduit 1. A free oxygen bearing fluidizing gas, such as air, enters reaction zone 32 via valved conduit means 7, windbox 6 and constriction plate 5 and maintains the finely divided solids as a fluidized bed 12. The temperature within reaction zone 32 is controlled to lie in the range from about 850° C. to about 900° C. and the atmosphere within reaction zone 32 is controlled to provide a deficiency of free oxygen. As previously noted, the oxygen supply is controlled so that the formation of non-volatile arsenic compounds is prevented while at least a portion of the sulfur content of the ore is oxidized to sulfur dioxide. It is desirable to oxidize a sufficient amount of the sulfur content of the ore in reaction zone 32 so that the desired reactions will proceed autogenously and produce the desired high temperatures without the necessity of supplying heat from other sources. In order that the reactions within reaction zone 33, as discussed below, will also proceed autogenously, and for other purposes mentioned herein, only so much of the sulfur content of the ore is oxidized within reaction zone 32 as will allow about 2% to 6% by weight sulfide sulfur to remain in the calcined products discharged from the reaction zone 32.

Partially roasted ores are discharged from reaction zone 32 to second reaction zone 33 via conduit 11 which is provided with a suitable gas sealing means 30 to prevent reaction gases from communicating between reaction zones 32 and 33.

A free-oxygen bearing gas, such as air, enters reaction zone 33 via valved conduit means 18, windbox 17 and constriction plate 16 and maintains the finely divided solids as a fluidized bed 23. A temperature of approximately 850° C. to 900° C. is maintained within reaction zone 33. Normally, the free-oxygen supply to reaction zone 33 is sufficient to insure complete oxidation of residual sulfur to $SO_2$ and iron to $Fe_2O_3$.

It may be noted in passing that circumstances may rise when it is desirable to recover and/or remove various base metal impurities contained in the ore. This may be accomplished by establishing operating conditions within the second reaction zone 33 which are conducive to the formation of water and weak acid soluble non-ferrous metal sulfates while simultaneously producing water and weak acid insoluble ferric oxide. If the roasting operation is so conducted, the non-ferrous metal impurities can readily be leached from the roasted product discharged from the second reaction zone 33. The above results are obtained by proper control of the temperature of the second reaction zone 33 as well as the amount of free oxygen introduced into this zone. Quite simply the temperature of zone 33 must be maintained (in relationship to the partial pressures of sulfur dioxide and oxygen) below the decomposition temperature of the non-ferrous metal sulfates but above the decomposition temperature of iron sulfate. For example, temperatures of about 650° C. are satisfactory if the non-ferrous metal is copper. Further, the free oxygen content of the gases entering fluidized bed 23 must be in excess of that amount of oxygen needed to convert all iron in the feed to zone 33 to $Fe_2O_3$; all non-ferrous base metals in the feed to zone 33 to their normal oxides (e. g. CuO, ZnO and PbO); and all sulfur in the feed to zone 33 to sulfur trioxide.

Roasted calcines discharged from the second reaction zone 33 are in condition for further treatment, such as sintering for blast furnace feed, leaching of base metal impurities if a sulfating roast has been conducted in the second reaction zone 33 or, alternatively, salt roasting for subsequent leaching of the various base metal impurities.

Gases leaving reactor 2 are conducted by conduit 8 to dust separator 9. These gases contain finely divided elutriated solids, $S_2$, $SO_2$, $As_2S_2$, $As_4$, and $As_4O_6$ as well as inert gases present in the fluidizing gases. Dust separator 9 and conduit means 8 are thermally insulated to maintain dust separator 9 at temperatures in excess of the sublimation temperature of the arsenic compounds, i. e. above approximately 650° C. This high temperature insures that none of the arsenic compounds condense on the elutriated solids during the separation. If the reaction temperature within zone 32 is maintained at about 900° C., dust separator 9 may be readily maintained at a temperature in excess of 650° C. Fine particles contained in gases leaving reactor 2 are removed by dust separator 9 and conducted via tailpipe 10 to comingle with solids discharged from reaction zone 32. The dust diminished gases leaving dust separator 9 are conducted via conduit 24 to a combustion chamber 25.

Fluidizing gases are discharged from second stage reactor 13 via conduit 19 to dust separator 20. These gases contain finely divided elutriated solids, sulfur dioxide and free oxygen as well as inert gases present in the fluidizing gases. Solids separated by dust separator 20 are led via tailpipe 21 to a suitable receptacle 29 where they are co-mingled with the other solid reaction products from reaction zone 33. Dust diminished gases from dust separator 20 are conducted via conduit 26 to combustion chamber 25 where they are co-mingled with the gases discharged from dust separator 9.

In addition to the free-oxygen contained in the gases discharged from dust separator 20, free-oxygen bearing gases, such as air, may be separately introduced into combustion chamber 25 via valved conduit 27 to insure that the free-oxygen available in combustion chamber 25 is sufficient to oxidize all sulfur vapor to $SO_2$ and all volatile arsenic compounds to non-volatile compounds such as $As_2O_5$ and/or metal arsenates. The resulting oxidized gases are discharged from combustion chamber 25 via conduit means 28 and are desirably further processed in gas scrubbing and/or electrostatic precipitation apparatus. By such means, the solid non-volatile arsenic compounds are removed from the gas stream and an $SO_2$ gas, free of arsenic contaminants, is made available for further processing as in the production of sulfuric acid.

This invention has been described with particular reference to apparatus consisting of two separate reactors. It is to be understood that the invention can be adapted to equivalent but slightly differing apparatus, as for example a single shell reaction vessel containing two or more fluidized reaction zones therein.

We claim:

1. A method for roasting pyrite ores containing arsenic comprising the steps of autogenously roasting said ores in an oxygen deficient atmosphere in a first fluidized treatment zone to produce volatile arsenic products, sulfur gases and partially roasted iron sulfides, removing said volatilized arsenic products from said first treatment zone with the exiting fluidizing gases, discharging solids from said first fluidized treatment zone to a second fluidized treatment zone, maintaining an atmosphere of excess free oxygen within said second fluidized treatment zone, autogenously roasting said solids in said second treatment zone to produce ferric oxide and sulfur dioxide, discharging roasted solids from said second fluidized treatment zone, conducting said exiting gases from said first treatment zone to a dust separator, the improvement which comprises: maintaining said dust separator at temperatures in excess of the condensation temperature of said volatilized arsenic products contained in said exiting gases, conducting solids separated in said dust separator to said second treatment zone, conducting effluent gases from said dust separator to a combustion chamber, introducing sufficient free oxygen bearing gases into said combustion chamber to oxidize substantially all volatile arsenic products contained in said effluent gases to solid arsenic compounds and all elemental sulfur and sulfide sulfur in said effluent gases to sulfur dioxide, transferring the combustion products comprising sulfur dioxide and solid arsenic compounds from said combustion chamber to a gas scrubbing stage to effect separation of said solid arsenic compounds from the gaseous sulfur dioxide, whereby substantially arsenic free sulfur dioxide is recovered and the iron content of said pyrite ores containing arsenic is recovered as ferric oxide substantially free of arsenic and suitably conditioned for blast furnace feed.

2. A method according to claim 1 in which the first fluidized treatment zone is maintained at a temperature substantially between 850° C. and 900° C.

3. A method according to claim 1 in which the dust separator is maintained at a temperature in excess of 650° C.

4. A method according to claim 1 in which the second fluidized treatment zone is maintained below the fusion temperature of the treatment solids.

5. A method according to claim 1 in which the temperature of the second fluidized treatment zone is maintained at substantially 650° C. whereby the formation of non-ferrous metal sulfates is favored.

6. A method according to claim 5 in which the non-ferrous metal sulfates are leached from the roasted solids discharged from the second fluidized treatment zone.

7. A process for the protection of iron oxides and sulfur dioxide substantially free of arsenic from finely divided pyrite ores containing arsenic by utilizing fluidized roasting techniques, the steps of roasting a mass of such finely divided solids under fluidizing conditions in a first reaction zone, maintaing a temperature within said first reaction zone substantially between 850° C. and 900° C. to volatilize said arsenic impurities, supplying free oxygen bearing fluidizing gases to said first reaction zone in sufficient quantities to autogenously roast said solids but in insufficient quantities to oxidize the contained arsenic impurities to a valance greater than +3, withdrawing from said first reaction zone volatilized arsenic compounds entrained in the exiting fluidizing gases, conducting said exiting gases from said first reaction zone to a first dust separator, separating solids entrained in said exiting fluidizing gases in said first dust separator, discharging solids from said first reaction zone to a second fluidized reaction zone maintained at temperatures below the fusion temperature of said solids, fluidizing finely divided solids in said second reaction zone with sufficient quantities of free oxygen bearing gases to autogenously roast the finely divided solids and oxidize substantially all residual sulfur content of said solids to sulfur dioxide and oxidize substantially all of the iron content of said solids to ferric oxide, discharging solids from said second reaction zone, withdrawing gases from said second reaction zone to a second dust separator and there separating entrained solids from the fluidizing gases exiting said second reaction zone, discharging the separated solids from said second dust separator, conducting the effluent gases from said second dust separator to a combustion chamber, the improvement which comprises: maintaining said first dust separator above the condensation temperature of said volatilized arsenic compounds, discharging separated solids from said first dust separator to said second reaction zone, discharging effluent gases from said first dust separator to said combustion chamber, introducing free oxygen bearing gases into said combustion chamber in sufficient quantities to oxidize substantially all elemental sulfur and sulfide sulfur to sulfur dioxide and substantially all volatilized arsenic compounds to solid arsenic compounds, discharging the products of combustion comprising sulfur dioxide and solid arsenic compounds from said combustion chamber, introducing said combustion products into a gas cleaning stage wherein solid arsenic compounds are removed from the sulfur dioxide gases, whereby substantially arsenic free sulfur dioxide gases are recovered from said pyrite ores containing arsenic and substantially arsenic free ferric oxide, suitable for blast furnace feed, is recovered from said pyrite ores containing arsenic.

8. A method according to claim 7 in which the first dust separator is maintained at temperatures above 650° C.

9. A method according to claim 7 in which the second fluidized reaction zone is maintained substantially in the range of 850° C. to 900° C.

References Cited in the file of this patent

UNITED STATES PATENTS

| | | |
|---|---|---|
| 1,941,592 | Bacon et al. | Jan. 2, 1934 |
| 2,596,580 | McKay et al. | May 13, 1952 |
| 2,650,159 | Tarr et al. | Aug. 25, 1953 |